United States Patent Office 3,437,436
Patented Apr. 8, 1969

---

3,437,436
PROCESS FOR THE PREPARATION OF HYDROGEN CYANIDE
Hendrikus C. M. Ummelen, Beek, and Alexis J. M. Pereboom, Maastricht, Netherlands, assignors to Stamicarbon N.V., Heerlen, Netherlands
Filed Sept. 2, 1966, Ser. No. 577,018
Claims priority, application Netherlands, Sept. 11, 1965, 6511879
Int. Cl. C01c 3/02
U.S. Cl. 23—151         10 Claims

ABSTRACT OF THE DISCLOSURE

The preparation of hydrogen cyanide is described, and in particular, a process is disclosed wherein hydrogen cyanide is produced from reaction of ammonia and hydrocarbon in the presence of substantial amounts of carbon disulfide (e.g., at least 0.05 mole per mole of $NH_3$), and in the absence of a catalyst, whereby thermal decomposition side reactions are decreased and good yields of the hydrogen cyanide are possible even when lower than usual reaction temperatures are employed.

---

Figure 1:
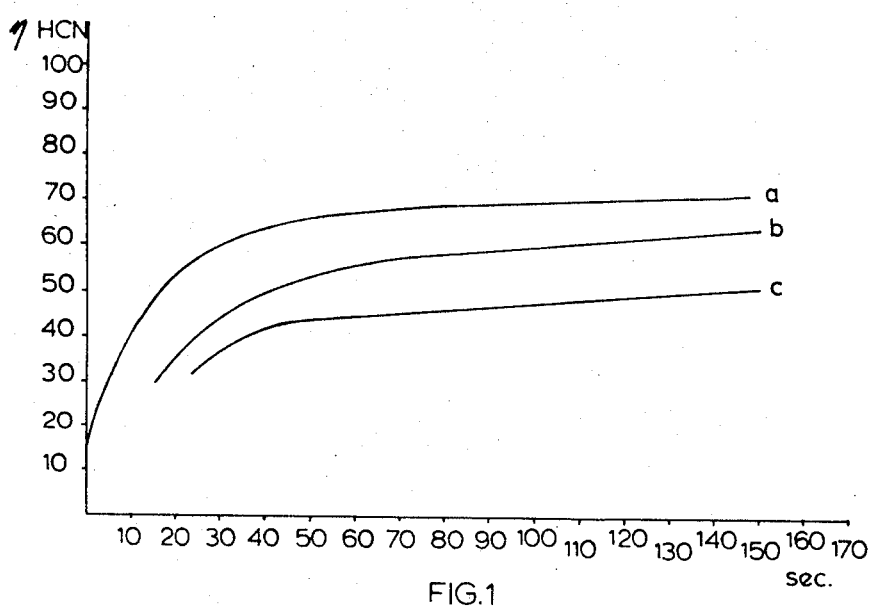
Figure 2:
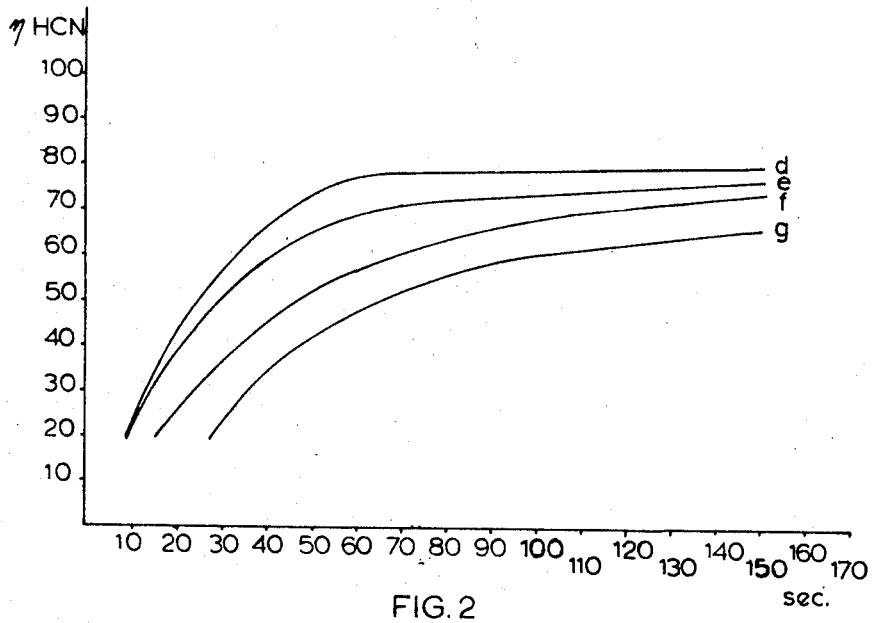
Figure 3:
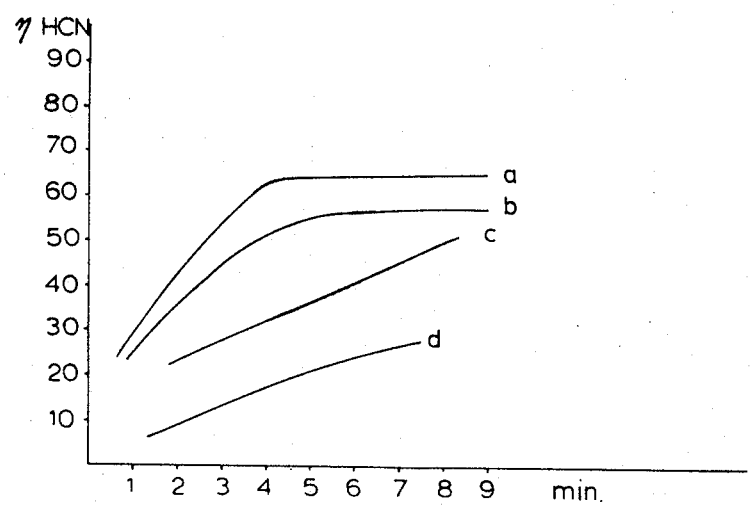
Figure 4:
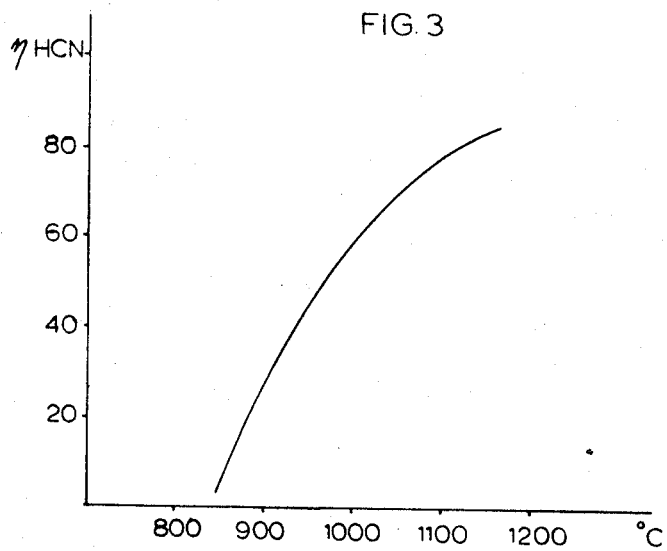
Figure 5:
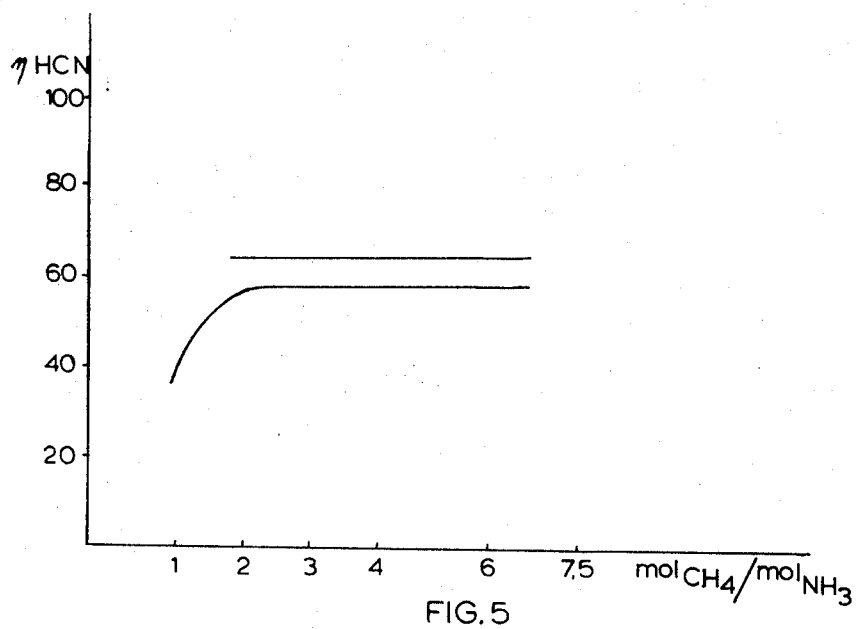

The present invention relates to an improved process for the preparation of hydrogen cyanide. More particularly, the present invention contemplates a reaction at high temperatures between ammonia and gaseous hydrocarbons or gas mixtures containing hydrocarbons in the presence of a sulfur-containing compound.

The general overall reaction of preparing hydrogen cyanide by reacting ammonia with a hydrocarbon is known. Suitable hydrocarbons for the purposes of the present invention are saturated or unsaturated aliphatic hydrocarbons, e.g., methane, ethane, ethylene and other low molecular weight compounds of the paraffin series, e.g., lower alkanes and alkenes. Also suitable as sources of the necessary hydrocarbons are natural or industrial gases containing such hydrocarbons, e.g., mineral gas, coke oven gas enriched in hydrocarbons or gas from petroleum oil crackers. A frequently available source of the hydrocarbon is a residual gas obtained from the low temperature separation of coke oven gas and containing about 75% by volume methane, the remainder of which being mainly nitrogen, hydrogen and carbon monoxide.

Aside from straight-chain aliphatic hydrocarbons, cyclic and aromatic hydrocarbons, e.g., cyclohexane and benzene, can also be used as the hydrocarbon in the process of the present invention.

To obtain high yields of hydrogen cyanide, it is customary to carry out the reaction at a temperature of at least 1150° C. Preferably, the temperature is several hundreds of degrees higher than this minimum. However, at these high reaction temperatures the yield of hydrogen cyanide becomes adversely affected by side reactions such as the decomposition of ammonia into nitrogen and hydrogen, and the decomposition of hydrocarbons with the formation of carbon deposits.

It has now been found that these side reactions are suppressed, while at the same time a very high yield of hydrogen cyanide is obtained, if the starting reaction mixture is provided so that it contains carbon disulfide in an amount of at least 0.05 mole per mole of $NH_3$. The carbon disulfide, in the reaction mixture of the present invention may be introduced as such, or may be added by the introduction of sulfur or a sulfur-containing compound which would combine with the hydrocarbon under the reaction conditions, to form the desired carbon disulfide in situ. For instance, an example of a sulfur compound capable of forming carbon disulfide in combination with the hydrocarbon under the reaction conditions is hydrogen sulfide.

The fact that carbon disulfide has some effect on the conversion of ammonia to hydrogen cyanide has already been mentioned in the British Patent No. 854,268. However, the British patent describes a different process wherein only small amounts of carbon disulfide, viz. 0.5–2% by volume, based on the amount of ammonia, are added. Moreover, in the process of said British patent, the ammonia is converted to hydrogen cyanide by reaction with fluidized solid carbon particles. Additionally, these solid carbon particles are maintained at the reaction temperature by *direct* heating means, viz. by passing through the carbon particles an electric current. It is clear, however, that heating by electric energy is relatively expensive and a conventional heating means, such as by the burning of fuel, is more economical.

By contrast with British Patent 854,268, in the process according to the present invention, a gaseous mixture containing ammonia and a hydrocarbon, is heated to the reaction temperature by means of *indirect* heat transfer through the wall of the reaction chamber. For a process of this type, the British Patent No. 335,585, on the other hand, has indicated that the removal of sulfur compounds from the gaseous mixture to be reacted was a necessity.

Surprisingly, and in complete contrast to the teaching of said British Patent No. 335,585, it has now been found that the presence of carbon disulfide, or sulfur or sulfur compounds capable of forming carbon disulfide under the reaction conditions, has a very favorable effect on the non-catalytic conversion of ammonia and gaseous hydrocarbons to hydrogen cyanide.

Although the applicants do not wish to be bound by any theoretical explanation, it is believed that in the conversion of ammonia and a hydrocarbon to hydrogen cyanide, the following reactions occur:

$$NH_3 + CH_4 \rightarrow HCN + 3H_2$$

$$2NH_3 \rightarrow N_2 + 3H_2$$

It is further believed that when carbon disulfide, or its equivalent, is present in said reactions, the following reactions will also take place:

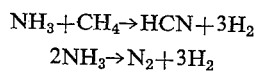
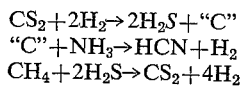

$$CS_2 + 2H_2 \rightarrow 2H_2S + \text{"C"}$$
$$\text{"C"} + NH_3 \rightarrow HCN + H_2$$
$$CH_4 + 2H_2S \rightarrow CS_2 + 4H_2$$

In these reactions "C" indicates an activated carbon atom.

In accordance with the above explanation, carbon disulfide, in the presence of hydrogen, is converted into hydrogen sulfide and carbon. Furthermore, the carbon thus formed is so activated that ammonia rapidly reacts with it to form hydrogen cyanide.

The above theoretical explanation is supported by the fact, discovered by us, that ammonia and carbon disulfide would react, in the absence of hydrocarbons, at temperatures of, say 1000° C., to form hydrogen cyanide, nitrogen and hydrogen sulfide.

The presence of a sufficient quantity of carbon disulfide, or sulfur and sulfur compounds which would be converted to carbon disulfide in the reaction mixture, thus assists the rapid formation of HCN and retards the decomposition reaction of $NH_3$ into nitrogen and hydrogen. The net result of the presence of carbon disulfide is that the efficiency of the conversion of ammonia to hydrogen cyanide is increased, and this increase in efficiency can be realized at lower reaction temperatures than those commonly used for the synthesis of hydrogen cyanide.

Furthermore, it has also been found that the molar ratio of hydrocarbon to ammonia in the reaction mixture has an influence on the conversion of ammonia to hydrogen cyanide: if a high conversion efficiency is to be achieved, it is recommended that an excess amount of the hydrocarbon, over and above the required stoichiometric quantity, be used in the gaseous reaction mixture, viz. an amount corresponding to the presence of at least 2 carbon atoms per mole of $NH_3$ in the mixture to be reacted.

To obtain a good conversion yield and to suppress undesirable side reactions, e.g., the decomposition of ammonia into nitrogen and hydrogen, in the known process for the preparation of hydrogen cyanide, in which ammonia and gaseous hydrocarbons are heated to a high temperature in the absence of sulfur compounds, it has been proposed to have the reaction take place in a long and deep reaction chamber which is relatively narrow. The walls of this reaction chamber are to be so heated that the temperature of the inner wall is at least 1150° C. These walls are to be made of materials which would not promote the thermal decomposition of ammonia. In addition, the length of time the reaction mixture is to be exposed to the high temperature in such a reaction chamber is relatively very short; the space velocity commonly mentioned is about 100 unit volumes of hot reaction mixture per unit volume of the reaction chamber per minute.

As the walls of the above-described reaction chamber must not contain substances such as metals containing iron, which would promote the thermal decomposition of $NH_3$, inert and heat-resistant materials such as quartz or sillimanite ($Al_2SiO_5$) must be used. Such a reaction chamber has the disadvantage that it is difficult to transfer a sufficient amount of heat to the reaction mixture, in the very short hold-up time mentioned to sustain the strongly endothermic reaction for the formation of hydrogen cyanide. The heat requirement is about 100,000 cal. per gram mole of hydrogen cyanide produced. The heat transfer rate through the walls of the reaction chamber is such that a much longer hold-up time than that indicated by the above space velocity is needed for supplying the necessary amount of heat by indirect heat transfer through walls of poorly conducting materials such as quartz or sillimanite. However, the longer hold-up times have a very unfavorable effect on the hydrogen cyanide yield, due to the considerable increase of the thermal decomposition of ammonia and/or hydrocarbon which would take place.

Therefore, the objects of the present invention include a novel process for the synthesis of hydrogen cyanide from hydrocarbons and ammonia, wherein the reaction mixture is provided so as to contain an amount of carbon disulfide of at least 0.05 mole per mole of $NH_3$.

It is another object of the invention to provide a process for the synthesis of hydrogen cyanide wherein a sufficient amount of heat can be transferred to the reaction mixture to sustain the endothermic reaction.

It is still another object of the invention to provide a process for the synthesis of hydrogen cyanide wherein the thermal decomposition of the reactants is greatly decreased.

It is a further object of the present invention to increase the efficiency of the reaction and the yield of hydrogen cyanide.

Still further objects can be gathered from a reading of the following description and appended claims.

It has now been found that the presence of carbon disulfide, sulfur or sulfur compounds in the reaction mixture for the synthesis of hydrogen cyanide permits the use of longer hold-up times without causing excessive thermal decomposition of the reactants. Thus, for example, hold-up times of about 0.5–2 minutes for the reacting gaseous mixture, equivalent to space velocities of about 2–0.5 volumes of hot gas per volume of reactor space per minute, can be advantageously employed. Moreover, an excellent yield of hydrogen cyanide can be obtained at the comparatively low reaction temperature of about 1000° C.

In one preferred embodiment, the present invention for the preparation of hydrogen cyanide is carried out in a chamber of a coke oven apparatus. In this manner, the process of the present invention may be carried out simultaneously with the normal coke preparation process. The large amount of heat required to sustain the hydrogen cyanide synthesis reaction can thus be obtained from an inexpensive source. When such a chamber within a coke oven is used for the synthesis of hydrogen cyanide, the temperature of the outer wall of the chamber is normally about 1300° C. and this temperature is maintained by the normal coke preparation process. This outer wall temperature will result in an inner wall temperature of about 1100° C. in the hydrogen cyanide synthesis chamber. The gaseous reaction mixture within the chamber can now be easily brought to a temperature of 1000° C. through normal heat transfer. At this temperature and in the presence of carbon disulfide the conversion of ammonia into hydrogen cyanide is relatively high while the undesirable decomposition of ammonia is kept within reasonable limits, even if holdup times of several minutes are used. The gaseous mixture containing hydrogen cyanide so prepared can be sent to the usual separation unit in the coke oven plant for hydrogen sulfide and hydrogen cyanide.

The hydrocarbon to be used in the synthesis can be obtained from various customary sources although natural gas is preferred for this purpose. Natural gas is relatively inexpensive and often has a hydrogen sulfide content which can be employed to advantage in the process of the present invention. If a natural gas is used which contains insufficient hydrogen sulfide for the present purposes, additional hydrogen sulfide may be added thereto. If the process of the present invention is carried out in a coke oven plant, any additional hydrogen sulfide which may be required can usually be obtained from the separation unit of such a plant.

The gaseous reaction mixture, containing ammonia, the hydrocarbon and carbon disulfide or hydrogen sulfide, may be pre-heated before its entry into the reaction chamber. Advantageously, the gaseous reaction mixture may be pre-heated to a temperature of about 500–800° C.

To further describe the invention, the following experimental results are given which show the influence of the several reaction variables involved. In these experiments, the gaseous reaction mixture was passed through a reaction tube which was maintained at a temperature of about 1000° C. in a furnace. In some of these experiments, the tube was packed with particles of silica stone and in the remaining experiments the tube was empty. As the results of the experiments show, a packed tube has a lower efficiency than an empty tube for the conversion of ammonia into hydrogen cyanide. This is, perhaps, because the large contact area between the gaseous mixture and the solid packing facilitates the decomposition of ammonia into nitrogen and hydrogen.

The gaseous reaction mixture in these experiments contained various amounts of ammonia, carbon disulfide and a natural or "residual" gas (containing about 75% by volume methane, the remainder being mainly nitrogen, hydrogen and carbon monoxide). However, Experiments Nos. 1–3 were carried out in the absence of the methane-containing gas so that the hydrogen cyanide produced resulted exclusively from the reaction between ammonia and carbon disulfide.

The results of these experiments are shown in the table below. In all cases, the hold-up time was reduced to the value for an empty reactor tube and cold entering gas (at 25° C., 1 atm.).

TABLE 1

| | Expt. No. | Molar ratio | | $N_2/NH_3$ | Hold-up time, sec. | $\eta$ HCN with respect to $NH_3$ |
|---|---|---|---|---|---|---|
| | | $CS_2/NH_3$ | $CH_4/NH_3$ | | | |
| Series A packed tube. | 1 | 0.5 | | | 26 | 26 |
| | 2 | 0.6 | | 3.2 | 39 | 26.5 |
| | 3 | 2 | | 3 | 48 | 37.4 |
| | 4 | 1.9 | 3.0 | | 41 | 63.6 |
| | 5 | 2.0 | 2.0 | | 44 | 68 |
| | 6 | 3.3 | 3.9 | | 57 | 67 |
| | 7 | 2.6 | 4.0 | | 181 | 81.5 |
| | 8 | 1.4 | 2.2 | | 44 | 50.1 |
| | 9 | 1.1 | 1.8 | | 130 | 66.5 |
| | 10 | 1.2 | 1.2 | | 145 | 63.1 |
| | 11 | 0.5 | 2.4 | | 127 | 51 |
| Series B non-packed tube. | 12 | 3.1 | 4.1 | | 96 | 78.6 |
| | 13 | 3.2 | 4.3 | | 174 | 80.6 |
| | 14 | 2.2 | 4.4 | | 93 | 73.6 |
| | 15 | 2.0 | 4.0 | | 174 | 81.1 |
| | 16 | 0.9 | 4.4 | | 93 | 59.9 |
| | 17 | 1.0 | 5.1 | | 150 | 79.7 |
| | 18 | 0.5 | 2.7 | | 112 | 63.6 |
| | 19 | 0.6 | 2.9 | | 207 | 74.6 |

In addition to the results shown in the above table, other experiments were carried out and the results of all experiments, including those shown above in the table, are now incorporated in the graphs shown in the attached drawings.

In one series of experiments, carbon disulfide was used as a sulfur-containing compound and the result of these experiments are graphically illustrated in FIGURES I and II. In the remaining experiments, the sulfur-containing compound employed was hydrogen sulfide and the result of these experiments are represented in FIGURES III–V. The experiments represented by FIGURES I–III were carried out at the reaction temperature of 1000° C. and a volumetric $CH_4/NH_3$ ratio of at least 2:1. FIG. IV shows the influence of the reaction temperature and FIG. V shows the effect of the molar $CH_4/NH_3$ ratios on the conversion efficiency.

FIGURE I is a graph containing a family of curves showing the influence of the molar $CS_2/NH_3$ ratio on the efficiency (N) of the conversion of ammonia into hydrogen cyanide. In FIGURE I, the ordinate represents the percentage conversion efficiency and the abscissa represents the hold-up time in seconds calculated for the cold gas mixture. The results shown in FIGURE I were obtained with a reactor tube which was packed with silica stones. In FIGURE I: curve $a$ represents results obtained from a gaseous reaction mixture having a molar $CS_2/NH_3$ ratio of at least 2:1; curve $b$ represents a molar ratio of $CS_2/NH_3$ of 1:1 and curve $c$ represents a ratio of 0.5:1.

FIGURE II differs from FIGURE I only in that the reaction tube was empty for this series of experiments. In FIGURE II: curve $d$ represents a molar $CS_2/NH_3$ ratio of 3:1; curve $e$ represents a ratio of 2:1; curve $f$ represents a ratio of 1:1 and curve $g$ represents the same ratio at a value of 0.5:1.

From FIGURES I and II it can be gathered that an increase in the $CS_2/NH_3$ ratio in the gaseous reaction mixture results in an increase of the conversion efficiency. Moreover, the conversion efficiency is higher when the reactor tube is empty than when it is packed with silica. Further, a hold-up time of at least one minute is preferred in order to realize the maximum degree of conversion. In addition, a space velocity of a hot gas mixture of at most four reciprocal minutes is preferred.

FIGURE III is similar to FIGURES I and II except that the carbon disulfide has been replaced with hydrogen sulfide. In FIGURE III, curve $a$ represents a gaseous reaction mixture having a molar $H_2S/NH_3$ ratio of 1:1; curves $b$ and $c$ represent molar $H_2S/NH_3$ ratios of 0.4:1 and 0.1:1 respectively; and curve $d$ represents gaseous reaction mixtures which contain no $H_2S$.

FIGURE III clearly shows the favorable influence of relatively high hydrogen sulfide concentration in the gaseous reaction mixture on the degree of conversion of ammonia to hydrogen cyanide. Thus, curve $d$ of FIGURE III shows that in the absence of hydrogen cyanide and with hold-up times of 2 and 4 minutes (calculated for a cold reaction mixture), equivalent to a space velocity of about 2 and 1 reciprocal minutes at 1000° C., the conversion efficiency is only about 10 and 17 percent, respectively. On the other hand, at a molar $H_2S/NH_3$ ratio of 1:1, the conversion efficiency under otherwise identical conditions increases to 44 and 64 percent, respectively.

A comparison of FIGURE III with the results of experiments in which carbon disulfide was used instead of hydrogen sulfide shows that the formation of hydrogen cyanide is faster with a gaseous reaction mixture containing carbon disulfide. This might be explained on the basis that a gaseous reaction mixture containing hydrogen sulfide, the hydrogen sulfide is first converted to carbon disulfide by the reaction between methane and hydrogen sulfide.

FIGURE IV shows the influence of the reaction temperature on the conversion efficiency. The gaseous reaction mixture employed for FIGURE IV contained a molar $H_2S/NH_3$ ratio of 0.4:1 and a molar $CH_4/NH_3$ ratio of 4:1. The hold-up time was at least five minutes for each experiment, calculated for a cold starting gaseous mixture, corresponding to a hold-up time of at least 70 seconds for the hot reaction gaseous mixture which has been previously brought to the reaction temperature. This hold-up time for the hot gaseous mixture is equivalent to a space velocity of 0.85 reciprocal minute. The curve in FIGURE IV shows that at the relatively low temperature of 1000° C., a conversion efficiency of 60% was realized. On the other hand, the decomposition of ammonia at this temperature appears to not have occurred to such an extent as to adversely affect the efficiency of the conversion of ammonia into hydrogen cyanide.

Finally, FIGURE V shows the effect of the molar $CH_4/NH_3$ ratios of the conversion efficiency. In FIGURE V a "residual" gas containing 75 percent by volume methane was used. The reaction temperature was 1000° C. and the hold-up time for the hot gaseous reaction mixture was about 70 seconds. Curve $a$ of FIGURE V represents a molar $H_2S/NH_3$ ratio of 1:1 and curve $b$ represents a ratio of 0.4:1.

It can be gathered from FIGURE V that it is desirable to use a molar $CH_4/NH_3$ ratio of at least 2:1 in order to obtain the optimum degree of conversion. This ratio is equivalent to having at least two carbon atoms per mole of ammonia present in the gaseous reaction mixture. The increased degree of conversion with a high molar $CH_4/NH_3$ ratio might be explained on the basis that when the concentration of ammonia in the reaction mixture is diluted by the presence of excess hydrocarbon, the thermal decomposition of the ammonia is retarded thereby. It has been found that under reaction conditions represented by curve $b$ of FIGURE V, the thermal decomposition of ammonia is about 30 percent of the total ammonia introduced when the molar ratio of the residual gas to ammonia is 1:1 but the thermal decomposition of ammonia decreased to less than 10 percent when the ratio of residual gas to ammonia was increased to at least 2:1.

It should be understood that the above experiments were performed with methane as the hydrocarbon component in the reaction mixture for the sake of simplicity and ease of comparison. However, other hydrocarbons can also be used which would react with ammonia to form hydrogen cyanide.

The invention has been described in detail with particular reference to preferred embodiments thereof, but it will be understood that variations and modifications can be effected within the spirit and scope of the invention as described hereinabove and as defined in the appended claims.

What is claimed is:

1. In a process for the preparation of hydrogen cyanide by the vapor phase reaction between ammonia and a hydrocarbon, the improvement comprises carrying out the reaction with a reaction mixture which consists essentially of ammonia, a hydrocarbon and carbon disulfide and wherein said hydrocarbon is present in an amount corresponding to the presence of at least two carbon atoms per mole of ammonia in the reaction mixture in the presence of at least 0.05 mole of carbon disulfide per mole of ammonia and wherein the reaction is carried out with heat supplied by means of indirect heat transfer.

2. A process according to claim 1 wherein the carbon disulfide is formed in situ by reaction between said hydrocarbon and a member selected from the group consisting of sulfur and a sulfur-containing compound.

3. A process according to claim 2 wherein said sulfur-containing compound is hydrogen sulfide.

4. A process according to claim 1 wherein the reaction is carried out at a temperature of at least 850° C.

5. A process according to claim 1 wherein there is at least 0.5 mole of carbon disulfide per mole of ammonia.

6. A process according to claim 1 wherein the reaction is carried out in a chamber of a coke oven so that the heat required for maintaining said reaction is supplied by the coke-making process.

7. A process according to claim 6 wherein the inside surface of said chamber is maintained at a temperature of about 1100° C.

8. A process according to claim 6 wherein said carbon disulfide is formed in situ by reaction between said hydrocarbon and hydrogen sulfide.

9. A process according to claim 8 wherein said hydrogen sulfide is supplied by said coke-making process.

10. A process according to claim 1 wherein the temperature of the reaction is between about 850° C. and 1200° C. and the contact times of the reacting mixture at said temperatures is between about 0.5 and 2 minutes.

References Cited

UNITED STATES PATENTS 1,735,409  11/1929  Pier et al. _____ 23—206

FOREIGN PATENTS 854,268  11/1960  Great Britain.
877,947  9/1961  Great Britain.

OSCAR R. VERTIZ, *Primary Examiner.*

H. S. MILLER, *Assistant Examiner.*

U.S. Cl. X.R.

23—206